United States Patent [19]
Streed

[11] 3,896,268
[45] July 22, 1975

[54] CIRCUIT FOR GENERATING A STEREO PILOT SIGNAL

[75] Inventor: Ramer W. Streed, Sioux Falls, S. Dak.

[73] Assignee: Sencore, Inc., Sioux Falls, S. Dak.

[22] Filed: May 29, 1973

[21] Appl. No.: 364,961

[52] U.S. Cl. .......................... 179/15 BT; 307/225 R
[51] Int. Cl. .......................... H04h 5/00
[58] Field of Search ........ 307/225 R, 261, 220, 271, 307/106; 328/25; 179/15 BT; 331/74–76

[56] References Cited

UNITED STATES PATENTS

| | | | |
|---|---|---|---|
| 3,283,079 | 11/1966 | Dixon | 179/15 BT |
| 3,340,476 | 9/1967 | Thomas | 307/261 |
| 3,349,257 | 10/1967 | Thomas | 307/261 |
| 3,350,575 | 10/1967 | Crouse | 307/261 |
| 3,350,651 | 10/1967 | Davis | 328/25 |
| 3,534,172 | 10/1970 | Weeda | 179/15 BT |
| 3,624,526 | 11/1971 | Silverman | 307/225 |
| 3,708,623 | 1/1973 | Dorren | 179/15 BT |
| 3,711,652 | 1/1973 | Metro | 179/15 BT |
| 3,714,595 | 1/1973 | Denenberg | 179/15 BT |
| 3,789,323 | 1/1974 | Anderson | 179/15 BT |
| 3,798,376 | 3/1974 | Limberg | 179/15 BT |

*Primary Examiner*—Kathleen H. Claffy
*Assistant Examiner*—Thomas D'Amico
*Attorney, Agent, or Firm*—Edmond T. Patnaude

[57] ABSTRACT

A 38Khz square wave is divided by two in a flip-flop to produce a 19KHz square wave which is integrated and then shaped to provide a 19Khz substantially sine wave signal in phase with the 38 KHz square wave.

3 Claims, 3 Drawing Figures

CIRCUIT FOR GENERATING A STEREO PILOT SIGNAL

The present invention broadly relates to a method and circuit for generating a 19KHz pilot for use in broadcast or simulated FM stereo transmission, and it relates more particularly to such a method and circuit requiring no initial or subsequent phase adjustment.

BACKGROUND OF THE INVENTION

The broadcast specifications of the Federal Communications Commission require that the FM stereo signal include a 19KHz pilot signal whose phase is within 3° of the 38KHz subcarrier. In addition, the transmitted signal must not include signals outside the alloted channel. In the prior art, these requirements have been met by means of a tuned circuit oscillator operating at 19KHz or by means of a signal derived from a 38KHz signal. In the latter case, the 38KHz signal is divided by two to provide a 19KHz square wave which is used to drive a 19KHz tuned circuit. With both methods, adjustment of the tuned circuits is necessary to control the frequency and phase of the pilot signal. In order to maintain the phase of the pilot signal within the specified limits, this adjustment is extremely critical making quantity production of the pilot generating circuits costly, particularly in test equipment having a simulated FM stereo signal output.

OBJECTS OF THE INVENTION

Therefore, a principal object of this invention is to provide a novel method and apparatus for generating a signal having a predetermined phase and frequency relative to another signal.

Another object of this invention is to provide a new and improved method and circuit for generating an FM stereo pilot signal.

A further object of this invention is to provide a new and improved method and circuit for generating an FM stereo pilot signal, which circuit does not require initial adjustment or later adjustment when a circuit component is replaced.

SUMMARY OF THE INVENTION

Briefly, the above and further objects may be realized in accordance with the present invention by applying a 38KHz subcarrier signal to a flip-flop to provide a 19KHz square wave signal in phase synchronism with the subcarrier, integrating the 19KHz signal to provide a 19KHz sawtooth wave signal and applying the latter signal to a wave shaping circuit to round off the top and bottom peaks of the sawtooth wave thereby to provide a substantially sine wave signal in phase synchronism with the subcarrier which is suitable for incorporation in a transmitted or simulated FM stereo signal.

BRIEF DESCRIPTION OF THE DRAWING

Further objects and advantages and a better understanding of the present invention may be had by reference to the following detailed description of the invention taken in connection with the accompanying drawing wherein.

DETAILED DESCRIPTION OF THE INVENTION

Figure 1:
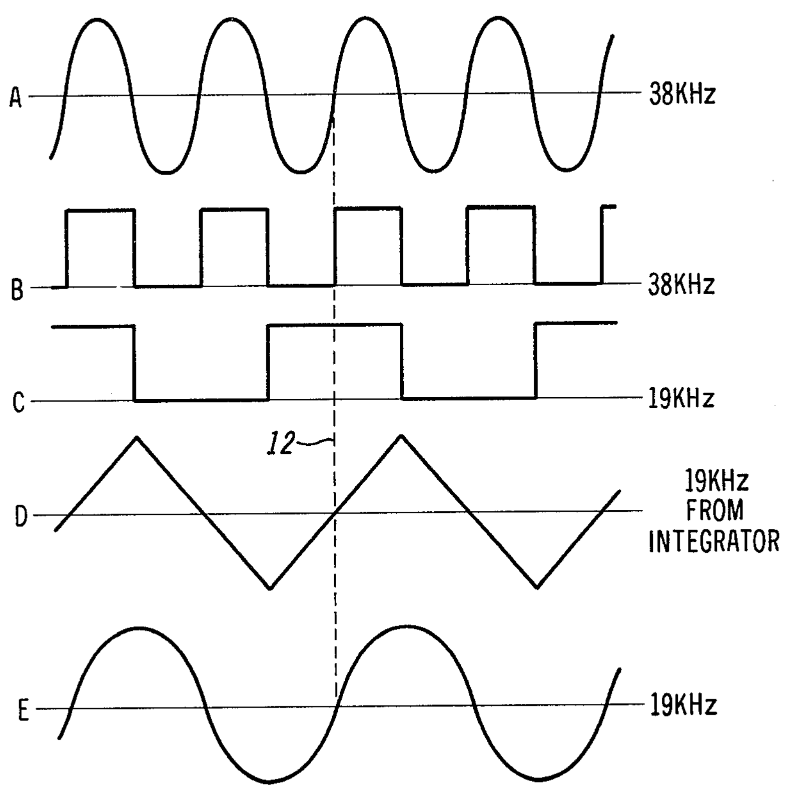
FIG. 1 shows a series of waveforms useful in an understanding of the present invention.
Figure 2:
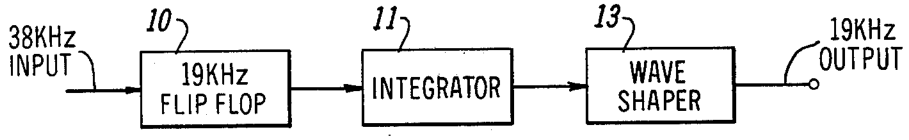
FIG. 2 is a block diagram illustrating the sequence of steps used to provide the desired output signal in accordance with the present invention.

Referring now to the drawing and particularly to FIGS. 1 and 2 thereof, a signal having a frequency of 38KHz is applied to a flip-flop 10 which changes state in response to a negative transition of the input to develop at the output of the flip-flop a 19KHz square wave signal which is in phase with the 38 KHz input signal. The input signal may be a sine wave as shown in FIG. 1A but preferably it is a square wave as shown in FIG. 1B. The waveform of the 19KHz output signal from the flip-flop is illustrated in FIG. 1C. While there is some small time delay caused by the circuit components of the flip-flop, it is negligible so that the waveforms 1B and 1C are in phase for all practical purposes.

The 19KHz square wave output signal from the flip-flop is integrated by application thereof to an integration circuit 11 to provide a 19KHz sawtooth wave as shown in FIG. 1D. As indicated by the broken line 12 in FIG. 1, the sawtooth wave output from the integrator 12 is in phase with the 38KHz input signal. This sawtooth is then shaped in a wave shaper 13 to round off the top and bottom peaks by removing the high frequency components thereof to provide a 19KHz input signal as illustrated in FIG. 1E which is substantially sinusoidal and in phase with the input signal. It will be noted that waveform 1E is displaced by 90° with respect to waveform 1C. Accordingly, the output signal is suitable for use as the FM stereo pilot for actual FM stereo transmission or as a simulated pilot for test purposes.

Figure 3:
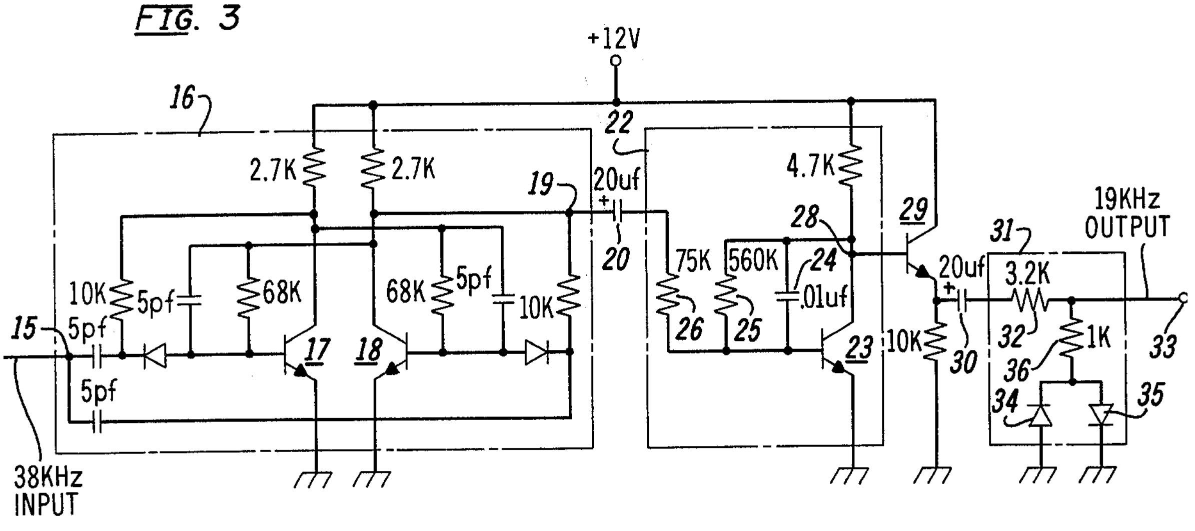
FIG. 3 is a schematic circuit diagram of a particular circuit embodying the present invention for developing a FM stereo pilot signal.

Referring now to FIG. 3, a 38KHz square wave signal is adapted to be supplied between ground and an input terminal 15 of a type T flip-flop 16 including a pair of transistors 17 and 18. The flip-flop 16 is of standard construction and is preferably an integrated circuit chip having an output terminal 19. Assuming an input signal at terminal 15 as shown in FIG. 1B, the output signal at terminal 19 is a square wave as shown in FIG. 1C. As may be seen by comparing waveforms 1A and 1B, the input signal at terminal 16 may be derived from the 38KHz subcarrier signal, or, as in some cases, the subcarrier may be derived from a 38KHz square wave as shown in FIG. 1B. While this signal has a frequency of 19KHz and is in phase with the input signal it is not suitable for use as the FM stereo pilot because of the substantial odd harmonics therein which would be transmitted outside the alloted channel and thus not meet FCC specifications.

The 19KHz square wave output signal at terminal 19 is coupled through a capacitor 20 to an integrating circuit 22 including a transistor 23 having a grounded emitter. An integrating capacitor 24 is directly connected between the base and collector of the transistor 23 and a large resistor 25 is connected in parallel therewith. The input signal is coupled to the base of the transistor 23 by a series connected input resistor 26. The integrating circuit 22 is a standard Miller type integrator generally available in the form of an integrated circuit chip and provides at an output terminal 28 a sawtooth signal as shown in FIG. 1D. This sawtooth output signal has a relatively low amplitude of about one volt peak to peak and is coupled through an emitter follower including a transistor 29 and a capacitor 30 to a passive wave shaping circuit 31.

As shown, the wave shaping circuit 31 comprises an input resistor 32 connected between the capacitor 30 and an output terminal 33. A pair of diodes 34 and 35 are connected in parallel in back-to-back relationship between ground and a resistor 36 connected to the output terminal 33. Using the circuit parameters given on the drawing, the signal developed at the output terminal 33 has a distortion of about 5 percent or less from a sine wave. If desired, less distortion may be achieved by the use of one or more additional wave shaping circuits of the type shown at 31. The output signal has a frequency of 19KHz and is in phase with the 38KHz input signal well within the FCC requirement of 3°. The phase error may, however, be made as small as desired by using a higher speed flip-flop. However, since 1° of phase shift of the 19KHz signal equates to 139 nano seconds of delay, it will be apparent to those skilled in the art that as far as FCC requirements are concerned the 19KHz output signal provided at terminal 33 is precisely phased with the 38KHz square wave and thus with the subcarrier. The integrator and wave shaper remove the harmonics from the 19KHz square wave without disturbing the precise phase relationship set by the flip-flop. No tuned circuits are employed and phase adjustments are not required, thereby eliminating the need of the prior art pilot generators for periodic phase tests and calibration. Moreover, replacement of the circuit components will not change the pilot phase outside of the design tolerance.

While the particular circuit components and parameter values are not critical, the values indicated in FIG. 3 have been found to provide a satisfactory pilot signal for FM stereo transmission or simulation.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A circuit for generating an FM stereo pilot signal comprising a flip-flop circuit having an output which changes state in response to a negative transition of the input, means for applying to said input a signal equal in frequency and phase to an FM stereo subcarrier signal, an integrator circuit having an input and an output, means coupling said output of said flip-flop circuit to said input of said integrator circuit, a wave-shaping circuit having an input and an output, and means coupling said output of said integrator circuit to said input of said wave-shaping circuit, whereby the signal developed at the output of said wave-shaping circuit is equal in frequency to one-half the frequency of said subcarrier signal and is in phase therewith.

2. A circuit according to claim 1, wherein said wave-shaping circuit comprises, a resistor connected in series with a pair of reversely connected diodes, said output of said wave-shaping circuit being across said resistor and said diodes.

3. A circuit according to claim 1 wherein the signal applied to the input of said flip-flop is a square wave.

* * * * *